United States Patent [19]

Ramsauer

[11] Patent Number: 5,685,181

[45] Date of Patent: Nov. 11, 1997

[54] SWIVEL LEVER CLOSING DEVICE FOR DOORS OF HOUSINGS OR CABINETS

[76] Inventor: Dieter Ramsauer, Am Neuhauskothen 20, D-42555 Velbert, Germany

[21] Appl. No.: 464,654

[22] PCT Filed: Dec. 7, 1993

[86] PCT No.: PCT/EP93/03437

§ 371 Date: Jun. 21, 1995

§ 102(e) Date: Jun. 21, 1995

[87] PCT Pub. No.: WO94/15049

PCT Pub. Date: Jul. 7, 1994

[30] Foreign Application Priority Data

| Dec. 22, 1992 | [DE] | Germany | 92 17 546 U |
| Apr. 20, 1993 | [DE] | Germany | 93 05 893 U |
| Oct. 5, 1993 | [DE] | Germany | 93 15 055 U |

[51] Int. Cl.⁶ ............................................. B60R 25/02
[52] U.S. Cl. ................... 70/208; 70/215; 70/462; 292/336.3
[58] Field of Search .............. 70/208, 190, 215–217, 70/209, 210, 221, 224, 450, 451, 452, 462, 466; 292/336.3, DIG. 30, 31

[56] References Cited

U.S. PATENT DOCUMENTS

| 4,631,937 | 12/1986 | Debus et al. | 70/208 X |
| 4,754,624 | 7/1988 | Fleming et al. | 70/462 X |
| 4,930,325 | 6/1990 | Ramsauer | 70/215 X |
| 5,347,834 | 9/1994 | Ramsauer | 70/208 X |
| 5,419,167 | 5/1995 | Yamada et al. | 70/462 X |

FOREIGN PATENT DOCUMENTS

| 0 261 266 | 3/1988 | European Pat. Off. |
| 0 443 177 | 8/1991 | European Pat. Off. |
| 0 504 044 | 9/1992 | European Pat. Off. |
| 2442943 | 8/1980 | France | 70/462 |
| 2 072 740 | 10/1981 | United Kingdom . |
| 2 208 524 | 4/1989 | United Kingdom . |

Primary Examiner—Suzanne Dino
Attorney, Agent, or Firm—McAulay Fisher Nissen Goldberg & Kiel, LLP

[57] ABSTRACT

A swivel lever closing device for operating locking systems such as locking bars which can be installed in a fold space in sheet-metal cabinet doors including a door plate which has a base plate with a swivel lever serving as a handle and with protuberances serving to engage in cut outs in the door. A first protuberance is formed at one end of the door plate in the region of a locking arrangement for the swivel lever. A second protuberance is formed at an other end of the door plate and is arranged at the door plate symmetrically with respect to rotation so as to be offset by 180° with reference to an actuating axis of the swivel lever. A locking bar is provided through a latch, with the swivel lever and an articulated spindle pinion and with receptacles in the cabinet for locking elements formed in the region of the locking bar. The door plate has a first door plate region and a second door plate region. The first door plate region is formed by the base plate whose protuberances, as upper and lower retaining blocks, can be secured in cut outs in the door leaf and the second door plate region is formed by a shoulder which is connected with the base plate. A vertically adjustable push plate is supported at the inside of the shoulder as a latch. The push plate has a first opening aligned with the center axis of the push plate for receiving the projection projecting from the locking bar and two additional recesses at an interval along the longitudinal axis relative to the first opening. The interval is the distance traveled by the push plate when the swivel lever is rotated by 90°.

10 Claims, 7 Drawing Sheets

SWIVEL LEVER CLOSING DEVICE FOR DOORS OF HOUSINGS OR CABINETS

BACKGROUND OF THE INVENTION a) Field of the Invention

The invention is directed to a swivel lever closing device for doors of housings or cabinets which preferably have walls of thin material such as sheet steel, in particular for operating locking systems such as locking bars which can be installed in the fold space in sheet-metal cabinet doors, which swivel lever closing device is formed of a door plate which has a base plate with a swivel lever serving as a handle and with protuberances serving to engage in cut outs in the door, wherein a first protuberance is formed at one end of the door plate in the region of a locking arrangement for the swivel lever and another or second protuberance is formed at the other end of the door plate and is arranged at the door plate symmetrically with respect to rotation so as to be offset by 180° with reference to the actuating axis of the swivel lever, wherein a locking bar is provided which is in a working connection, through a latch, with the swivel lever and an articulated spindle pinion and with receptacles in the cabinet for locking elements formed in the region of the locking bar.

b) Related Art

A swivel lever closing device of this type is already known from EP 0504044 A1.

This closing device represents an improvement over a closing device known from EP 0261266 B1. The dosing devices known from these two publications are provided for switch boxes, but also for cabinets or housings which are used in work places for electronics and other technical fields to house electronic devices or components. Such cabinets or housings usually have construction dimensions of 19 inches, but can also be manufactured in metric sizes. The use of especially narrow counter-folds has proven advisable to provide a usable interior space which is as large as possible and easily accessible. For example, a narrow hollow section serves as a mounting frame to which side walls or rear walls and doors are attached. Alternatively, switch boxes formed from bent sheet metal can also be provided, these switch boxes having a folded region in which locking devices, e.g., bar locks such as are already known from the cited references, are advisably accommodated. In the swivel lock device known from EP 0261266 B1, the base plate comprising the door plate is so disposed in the door leaf plate provided in the region of the swivel lever articulation that one of its protuberances or shoulders is arranged in a first rectangular opening, while a second protuberance or shoulder is provided for receiving a cylinder lock supported in the free end of the swivel lever. The described dosing device and its base plate, respectively, have the same approximate length as the swivel lever. The two openings are arranged so as to be axially symmetrical with respect to the longitudinal axis and the closing device can accordingly be installed in these two rectangular openings of identical dimensions in such a way that it is possible to switch from the right-hand side to the left-hand side. However, the lock itself is arranged eccentrically. This eccentricity in the drive region has disadvantages. In contrast, the closing device according to EP 0504044 A1 has three rectangular openings of identical dimensions, the center opening being arranged centrally with respect to the door plate as is shown in FIG. 14 of this reference. The known swivel lever closing devices can be used for different door closures, but their use in combination with bar locks, especially with flat bar locks, is particularly advantageous because this provides particularly favorable opportunities for accommodation in narrow profile spaces such as in the fold space in sheet-metal cabinet doors.

The door plate is fastened by means of projections on its base plate which can be inserted into the openings of the door leaf, these openings being rectangular in particular and having identical dimensions, or which engage behind the openings or by means of a cap part or retaining part which is screwed on from the inside of the door (as is the case in EP 0261266 B1).

The known swivel lever closing devices require little space and are suitable for doors closing on the left-hand or right-hand side. However, in the case of the fitting according to EP 0261266 B1, when subsequently changing the side on which the door is fitted it is necessary to remove the locking bar, of which there is at least one, as well as the lock. Further, in both of the known dosing devices, the locking bar which is guided in the region of the base plate may possibly be a hindrance to the construction design, particularly in the region of the cylinder lock. Preventing this by bending the locking bar increases production costs and makes the arrangement more complicated and the assembly more involved.

OBJECT AND SUMMARY OF THE INVENTION

The primary object of the present invention is to provide a reliably functioning closing device which has a simple design and is suitable for cabinets and housings with narrow counter-folds. Further, installation should be possible on doors closing on the right-hand side and doors closing on the left-hand side using the same structural component parts and it should be possible to change the closing side subsequently with a very small amount of labor. In particular, it should not be necessary to bend the locking bars.

This object is met in that the door plate has a first door plate region and a second door plate region, the first door plate region being formed by the base plate whose protuberances, as upper and lower retaining blocks, can be secured in cut outs in the door leaf, while a second door plate region is formed by a lateral shoulder integral with the base plate, a vertically adjustable push plate being supported at the inside of the lateral shoulder as a latch, and in that the push plate has a first opening aligned with the center axis of the push plate for receiving the projection projecting from the closure housing and two additional recesses at an interval X along the longitudinal axis relative to this recess, wherein the interval X is the distance traveled by the push plate when the swivel lever is rotated by 90°.

This design offers three distinct possibilities of application for a swivel lever lock formed in this way without necessitating its removal from the door leaf. On the one hand, the swivel lever could be lockable in a position in which the swivel lever faces downward, whereas a position directed vertically thereto would be the open position of the lock. The upper articulated region in the base plate serving to receive the swivel lever could then be closed by a dummy insert.

Conversely, as an alternative, the lower protuberance could also remain unused and, if necessary, could be closed by an insert, while the upper protuberance functions as the receptacle for the cylinder lock and forms that position of the swivel lever in which the switch box or the like is closed. In this second alternative, also, the horizontal position of the swivel lever would be the position in which the door could be opened.

Finally, in a third possible alternative, the door would be closed with the swivel lever in the downward position and with the swivel lever in the upward position, whereas a horizontal position of the swivel lever oriented normal to the latter positions would be the open position for the switch box.

Given suitable different dimensions, there is even a fourth alternative in which one position of the swivel lever (e.g., the upward position) would be the closing position and the second position of the swivel lever, in which it is rotated downward by 180°, would be the open position so that in the process of swiveling by 180°, the closing device would move from the closed state to the open state and vice versa. A particularly advantageous application for the swivel lever device according to the invention has a locking bar which is in a working connection with the swivel lever and an articulated spindle pinion through a latch and has receptacles in the cabinet for locking elements formed in the region of the locking bar.

As has already been mentioned, the door plate according to the invention has a first door plate region and a second door plate region, the first door plate region being formed by the base plate whose protuberances, as upper and lower retaining blocks, can be secured in cut outs in the door leaf, while a second door plate region is formed by a lateral shoulder connected with the base plate, a vertically adjustable push plate being supported at the inside of the lateral shoulder as a latch. If the base plate and the lateral shoulder form one piece according to a further development, the base plate loses its symmetry with respect to the longitudinal axis as compared with the prior art. However, this loss is offset by the symmetry which is now provided according to the invention with respect to the transverse axis, so that it is still possible to switch from right to left, specifically without modifying or disassembling the swivel lever lock. According to another further development of the invention, however, the base plate and the lateral shoulder can form more than one part, that is, they can comprise two parts which can be connected with one another.

In both cases, the lateral shoulder provides the additional advantageous possibility of a more favorable accommodation of the locking bars and associated drive for certain types of applications, since it dispenses with bending on the one hand and with an opening in the door leaf for the actuating pin of the swivel lever on the other hand. Instead, the bars are driven above the plane of the door leaf by a pinion which engages in the push plate and displaces it in a reciprocating manner to actuate the locking bars. The connection between the push plate and the respective locking bars can then be adapted to the application in question. Embodiment forms are explained more fully in the following. For instance, for the purpose of a quicker fastening which can be changed subsequently if desired, the cut outs in which the base plate is held by the upper and lower retaining blocks are advantageously arranged in the region of or in proximity to a hat-shaped folded section on the door leaf, wherein the cut outs are advisably constructed so as to complement the retaining blocks, which are rectangular in particular, and it is provided that the retaining blocks are fastened with the fastening elements which can be inserted, if required, proceeding from the hat section or folded section or from the rear of the door leaf. For fastening purposes, bore holes are provided in the retaining block, e.g., in alignment with openings in the U-shaped section, so that a reliable and stable fastening of the base plate with the swivel lever and locking device can be achieved with fastening elements such as screws which are inserted proceeding from the U-shaped section. Other fastening possibilities are shown in the prior art.

Sealing can also be carded out by providing a sealing strip between the hat section, door leaf or the like and the retaining blocks or base plate. Moreover, sealing can also be effected in the region of the fastening elements and their openings.

The push plate mentioned above, which is arranged at the inner side of the shoulder or at the outer surface of the door leaf as a latch, is arranged so as to be vertically adjustable.

The push plate which can be actuated via the handle and articulated spindle pinion is in a working connection with a locking bar which is arranged parallel to the push plate and provided with locking elements for engaging in receptacles provided in the cabinet or housing. The locking bar and push plate are connected by a driver or actuating finger which can be constructed so as to be reversible, enabling the lock to be reversed in a simple manner. Further, there are, for example, three different possible mounting positions which also enable adjustability.

An articulated spindle pinion advisably serves to displace the push plate. This articulated spindle pinion meshes with teeth provided on the push plate and accordingly imparts a vertical movement to the push plate which can be transmitted to the locking bar through the driver. Accordingly, when the door is closed, at least one locking element moves into a positive engagement and/or frictional engagement with at least one corresponding receptacle in the cabinet or housing.

It is particularly economical with regard to space to construct the door plate in such way that the articulated spindle pinion and push plate are received virtually in a positive engagement in a relatively flat intermediate space formed by the base plate and shoulder plate which can be integral with the latter. The 90-degree deflection formed between the push plate and locking bar also reduces the space requirement in the horizontal direction. Therefore, this deflection enables the use of a narrow counter-fold, that is, e.g., a narrow hollow section frame or fold space in housings and cabinets. The advantage herein consists in that a larger usable interior space is available for the arrangement of electrical and electronic components. Further advantages consist in the possible arrangement of a cable holder or cable guide at the inner side of the narrow section frame in addition to improved circulation of air and improved cooling of the devices and components.

Two openings are sufficient for centering and fastening the base plate of the closing device, these openings advisably having the same dimensions and lying symmetrically relative to the center axis of the door. The door can accordingly be turned around in a simple manner without requiring any modification of the closing device. Alternatively, an individual elongated opening can be provided.

A third opening can be provided in the region of the swivel axis of the swivel lever if desired. Further, additional circular openings can also be provided in the region of the lateral shoulder of the base plate to achieve additional stability.

The driver which can extend along virtually the entire length of the shoulder plate and can be connected with the locking bar through connecting regions engages in a recess of the push plate by means of a projection so that the vertical adjusting movements of the push plate are transmitted to the driver and locking bar.

The locking bar which is arranged vertically to the plane of the push plate and door surface, like the parallel driver, extends beyond the door plate region and is held in at least one rigid guide so as to be stable and adjustable. A bar guide of this type can be constructed, for example, from a guide block with a recess adapted to the cross section of the locking bar. The locking bar preferably has a rectangular cross section.

In order to simplify assembly and adaptability, it is advantageous to fasten the guide blocks at the inner side of the door so as to be detachable and, if need be, displaceable.

In view of the special design of the closure described herein with the two possibly lockable positions of the swivel lever, it is advisable that the locking elements also have a special shape. For example, they may be formed of two rotating elements which are arranged horizontally on either side of the locking bar, in particular two rollers, and can comprise a receptacle in the cabinet or housing which receives the locking bar and rollers in this region and is constructed so as to complement the latter, these two rollers and the locking bar being held in the receptacle in a positive engagement or frictional engagement. This receptacle advantageously allows the rollers to move in from both directions, wherein the receptacle is effected centrally when the door leaf is swung out resulting in a locking when the rollers are displaced upward or downward from this central receiving space.

In so doing, it is advisable to provide vertically arranged wedge surfaces to facilitate the guiding-in of the locking elements.

BRIEF DESCRIPTION OF THE INVENTION

The invention is described more fully in the following with reference to embodiment examples shown in the drawings.

DESCRIPTION OF THE PREFERRED EMBODIMENTS

Figure 1:
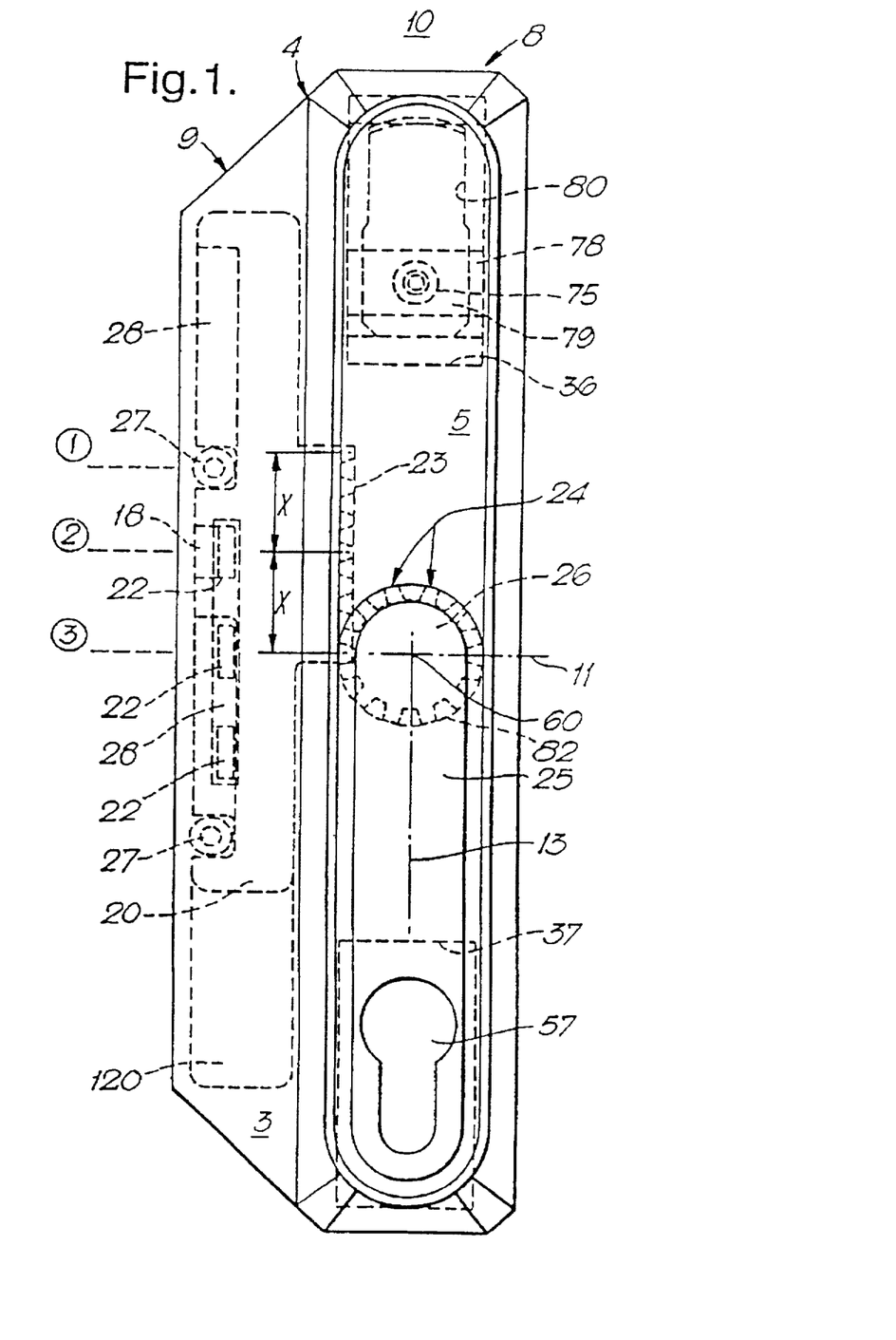
FIG. 1 shows a top view of a closing device constructed according to the invention.
Figures 2, 7, 8:
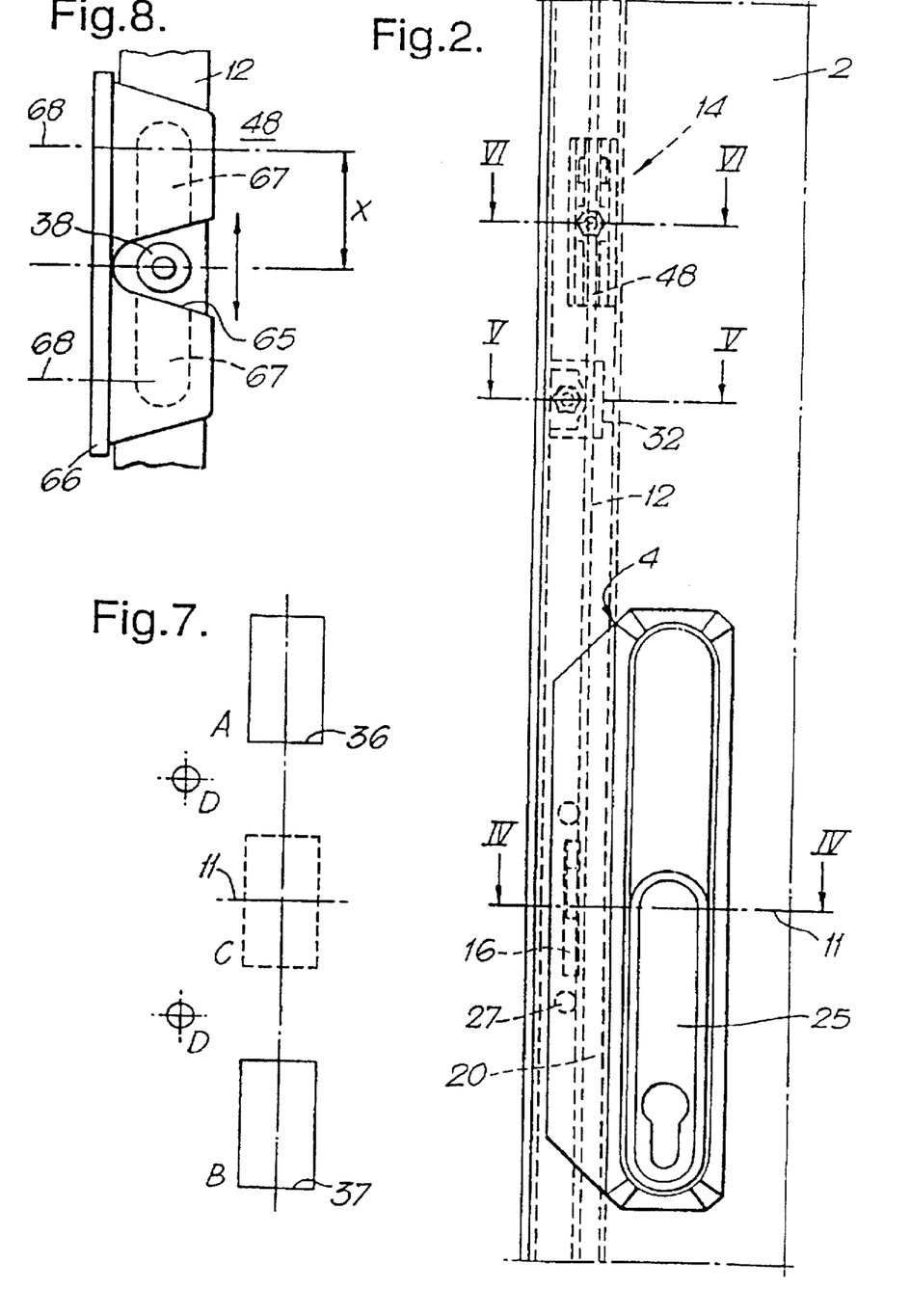
FIG. 2 shows a scaled-down view of this closing device in combination with locking bars fitted in a door leaf.
FIG. 7 shows the hole pattern associated with the closure according to FIG. 2.
FIG. 8 shows a side view of the locking region shown in FIG. 6.
Figure 4:
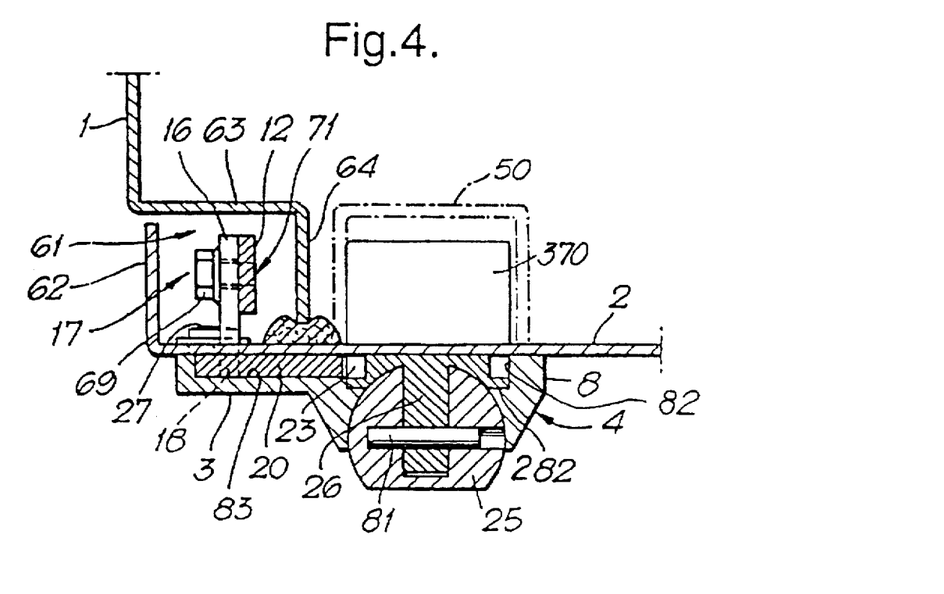
FIG. 4 shows a cross-sectional view of the closing device along lines IV—IV of FIG. 2.

FIG. 1 shows a top view of a swivel lever closing device 10, designed according to the invention, in an exemplary arrangement according to FIG. 2 at a sheet metal cabinet door 2 which is in turn suitably fitted within a frame 1 of a switch box, sheet-metal housing or the like (see FIG. 4).

The swivel lever closing device has a door plate 4 which is arranged on the outer surface of the door leaf 2. The door plate 4 has a base plate 5 as a first door plate region 8 and a shoulder 3 as a second door plate region 9, this shoulder 3 preferably being connected integral with the base plate 5.

A swivel lever 25 is arranged as a handle in the region of the base plate 5 and can be secured in the closing position indicated in the drawing through a key-operated locking arrangement 56, preferably a cylinder lock 57. The locking arrangement, e.g., a cylinder lock 57, need not be accommodated in the swivel lever 25, as in the embodiment example shown in the drawing, but rather can also be arranged inside the door plate 4 and can hold the swivel lever in its swiveled-in position in a suitable manner.

In order to convert a left-handed door such as that shown in FIG. 4 into a right-handed door in a simple manner, the entire arrangement shown in FIG. 1 is constructed so as to be axially symmetrical with respect to a line 11 bisecting the door leaf 2. The corresponding hole pattern in the door leaf is likewise axisymmetrical around this axis 11 and comprises, e.g., the two rectangular openings A and B (see FIG. 7) or an elongated opening E (see FIG. 14). Therefore, in order to carry out this conversion, the door leaf need only be rotated by 180° so that the portion of the door plate which was formerly at the top in FIG. 1 is now located on the bottom and the portion (shoulder) formerly on the left side is now on the right side. As a result of the symmetrical arrangement, the swivel lever can also be locked again in the swiveled-down position, for instance, so that it is possible to switch the closing side of the door leaf from the right side to the left side without changing the swivel lever closing device in any way.

On the other hand, reversibility can also be achieved in that the base plate 5 is constructed symmetrically around the longitudinal axis 13 and the shoulder plate 3, which is not integral with the base plate in this case, is switched as desired from one side edge of the base plate 5 to the other side edge. However, this is more involved and entails some assembly work in order to achieve reversibility from the right side to the left side.

Figure 5:
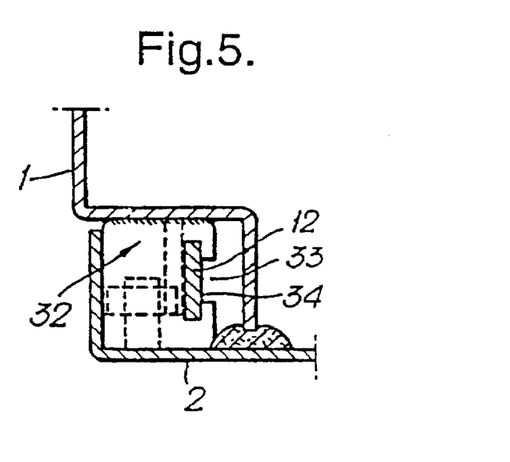
FIG. 5 shows a cross-sectional view along lines V—V of FIG. 2.

Assembly can be effected within a hat section 50 or simply within the free space formed on the rear surface of the door leaf 2 (see FIG. 4). It is relatively unimportant which type of assembly is used, since the actual locking bar devices which take up space do not pass through this region as is the case in EP 0 261 266 B1, but rather pass through a region disposed at an offset thereto which extends parallel to the longitudinal axis 13 and lies substantially below the shoulder 3 and within the fold space 61 shown in FIG. 4 which is formed on one side by the fold 62 of the door leaf 2 and on the other side by the folds 63, 64 of the door frame 1 or the like as is clearly shown in FIG. 1. The locking bars which are also provided in the prior art and are constructed in this instance, as in the prior art, as upended flat bars 12, can also be conveniently guided within this fold space 61, e.g. by means of the bar guide which is shown in FIG. 5 as well as in the prior art (see FIG. 7 of the cited patent).

In a corresponding manner, closing elements comprising a lock part 40 which is secured to the door frame 1 and roller pins 38 which are supported by the flat bar 12 and can be inserted into this structural component part supported by the door leaf 1 can also be accommodated within this space. The prior art cited above also shows a similar construction in FIG. 6, although its shape which is asymmetrical around a horizontal axis would only have limited applicability in the present case.

Figure 3:
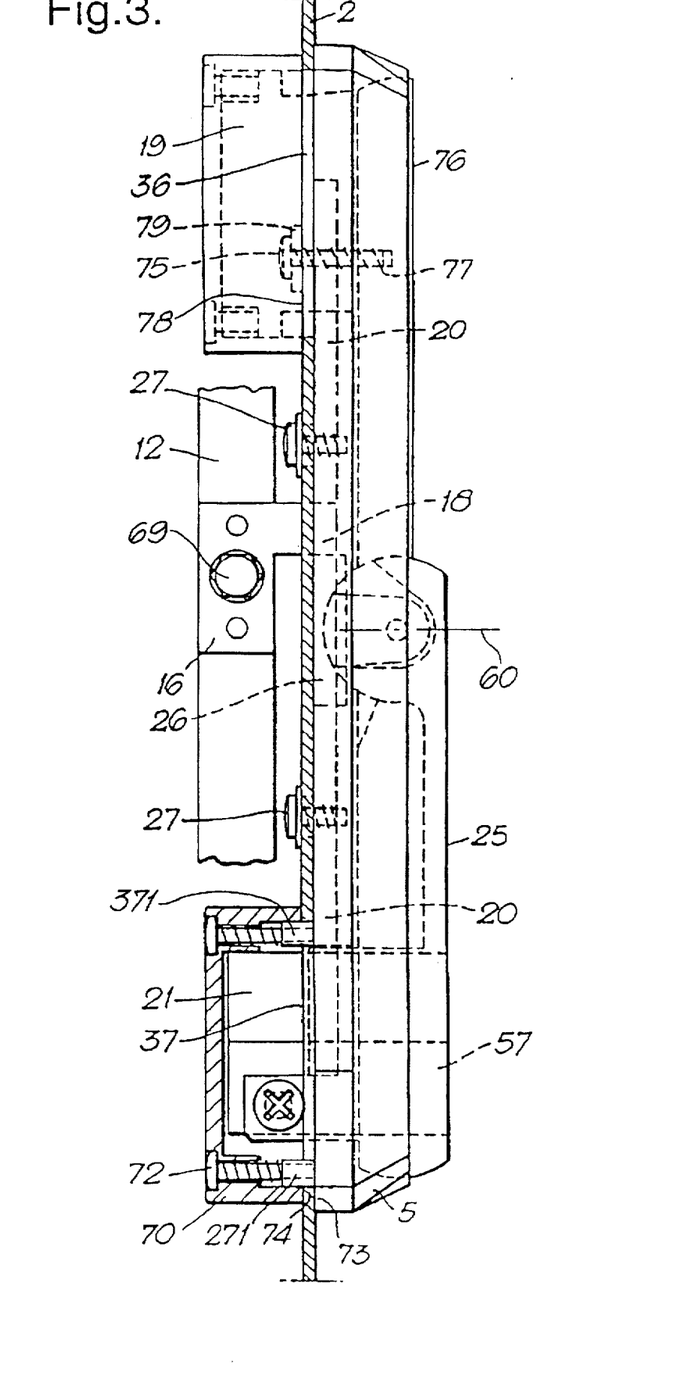
FIG. 3 shows a partially cut away side view of the swivel lever closing device shown in FIG. 1.
Figure 6:
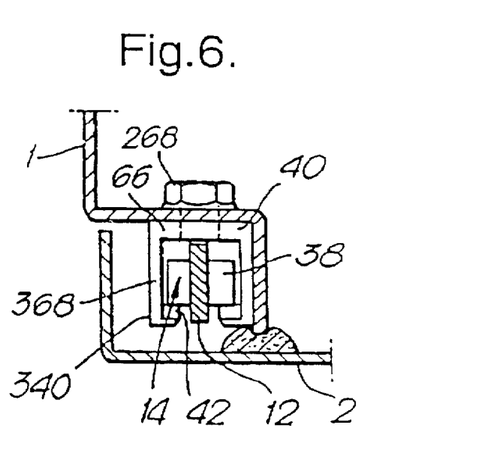
FIG. 6 shows a cross-sectional view along lines VI—VI of FIG. 2.
Figure 9:
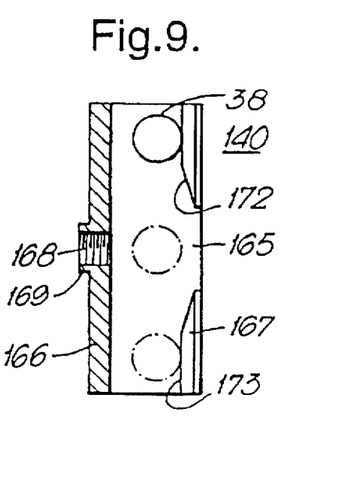
FIG. 9 shows an axial longitudinal section through a particularly advantageous construction of the locking part.
Figure 10:
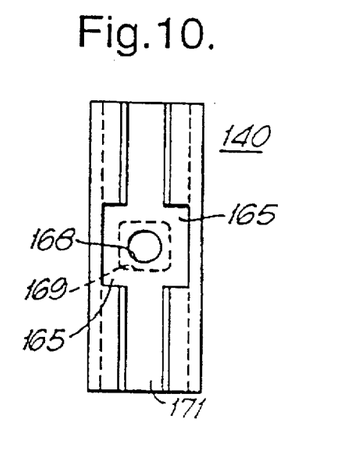
FIG. 10 shows a right side view of the part according to FIG. 9.
Figures 11, 13:
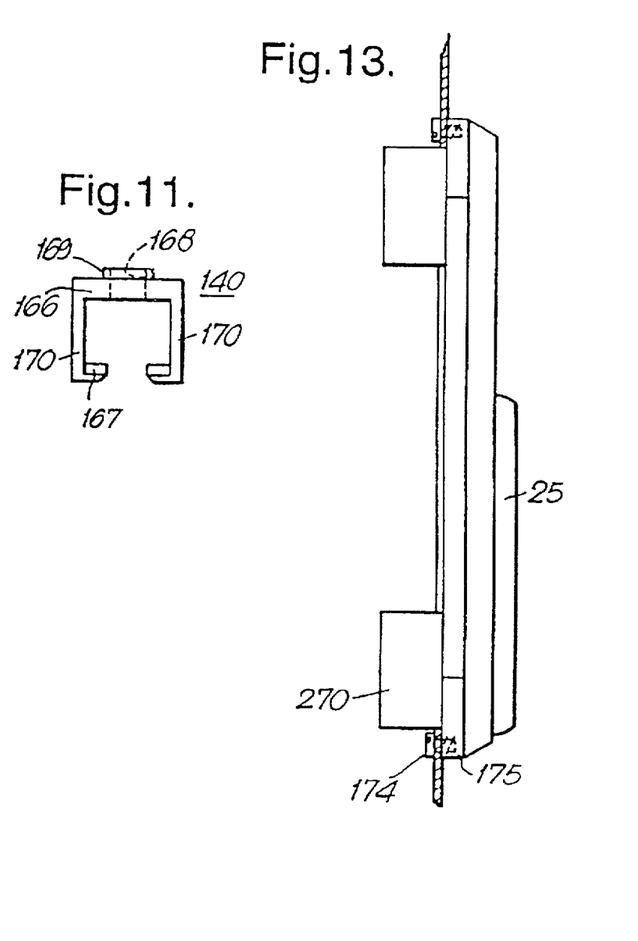
FIG. 11 shows a top view of the part according to FIG. 10.
FIG. 13 shows a side view of the arrangement according to FIG. 12.

For the purpose of symmetry with respect to construction and with respect to actuation, it is more advisable, according to FIG. 8, that the hook-shaped run-in elements provided as the closing element for the double roller pins 38 be doubled, specifically such that the double roller pins 38 can move into a conically widening slot 65 in a determined position of the locking bar 12 formed by the two open ends of two hooks 67 which are mounted on a common base 66 or project from the latter so as to be integral therewith. This base 66 is then fastened in turn to the door frame 1 by head screws which are shown in FIG. 6 (e.g., see reference number 68). The hook-shaped configurations 67 can be open as shown in FIG. 3 of the prior art (reference number 38) or can have side walls 68 to increase stability and prevent bending under heavy loading. Further particulars of an alternative embodiment form are shown in FIGS. 9 to 11 in which a base 166 which can be fastened to the door frame so as to be fixed with respect to rotation relative to it by means of only one screw (see rectangular projection 169 in the region of a threaded bore hole 168) supports two side walls 170 between which the bar with roller pins has sufficient room for displacement. At their free ends, these walls have strip shoulders which form run-over regions 167 and leave sufficient clearance 171 to allow the locking bar to pass through and a central clearance 165 allowing the roller pin 38 to pass through (see FIGS. 9 and 10). The run-over regions 167 have an inclined region 172 for drawing in the door and a planar region 173 for securing the door.

The position of the pin 38 shown in FIG. 8 is the open position, e.g., a position in which the swivel lever is swiveled into the horizontal line, for instance, while the moved-in position, e.g., in which the roller pin 38 running into the hook region is located at the bottom, would be the position in which the swivel lever is located in its lower (or upper) swiveled-in position, whereas the pin 38 is moved into the upper pocket according to FIG. 8 when the swivel lever is arranged in its upper (or lower) swiveled-in position.

As a result of the aforementioned symmetry with respect to the swivel lever region and closing elements according to FIG. 8 and FIGS. 9 to 11, the ratios are completely identical whether the doors close to the right or, after rotating by 180°, to the left.

Additional adjusting possibilities will become clear in the following more detailed discussion of the closure shown in FIGS. 1, 2, 3 and 4.

Figure 15:
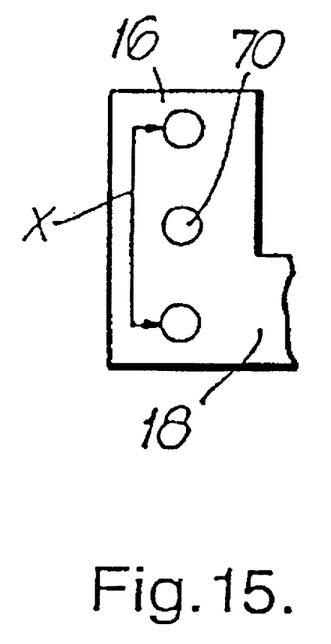
FIG. 15 shows the bar-shaped driver of FIG. 3.

FIGS. 2, 3 and 15 provide a schematic overall view of the closing device 10 according to the invention. As will be seen from the drawings, a bar-shaped driver 16 is provided in the region of the shoulder 3 of the door plate 4. This driver 16 is connected with a push plate 20 via a projection 18 (see FIGS. 1, 3 and 4) and is displaced in the vertical direction with this push plate 20. A locking bar 12 extends above and below the door plate 4 parallel to the driver 16 and is arranged along with the latter in a connection region 17 along the surface of the driver 16, e.g., by means of a screw bolt 69 which projects through one of three bore holes 70 shown in FIG. 3 and is screwed into a threaded bore hole 71 (FIG. 4) in the locking bar 12. As will be seen from the drawings, the locking bar 12 and the driver 16 are arranged vertically with respect to the inner side of the door 2 and relative to the plane of extension of the shoulder 3.

Alternatively, a flat strip bar 12 extending parallel to the door leaf 2 can, of course, also be provided, e.g., in that the projection 18 is bent again by 90° so that it can be connected with the locking bar 12, or a round bar can be provided and connected in a suitable manner with the projection 18.

FIG. 2 also shows that the locking bar 12 is provided above (and below, although this is not shown in the drawing) the door plate 4 with bar guides 32 fastened at the inner surface in the vicinity of the fold (see also FIG. 5). In this case, locking elements 14 which have also already been mentioned and shown in FIG. 6 as hook-shaped run-in elements, are provided in relative proximity to these bar guides (for the purpose of relieving the bar). These locking elements 14 have rollers 38 supported at both sides of the locking bar 12 with at least one receptacle 340 or 140 which are arranged in the cabinet or housing and can receive these rollers. The construction of this receptacle has already been discussed in detail in relation to FIG. 8 and FIGS. 9 to 11. FIG. 2 shows that a dependably functioning latching and locking can also be effected in particularly narrow receptacles 40 in the cabinet as a result of the locking bar 12 which is arranged vertically with respect to the inner side of the door, which also enables the use of relatively narrow vertical spaces or section frames for cabinets and housings as is the case in the prior art.

The arrangement of the locking elements and the bar guides in the respective corner regions results in a particularly high stability, also against rotation of these block-shaped elements, even when the latter are fastened only by one fastening bolt as is the case in the guide element according to FIGS. 5 and 9 to 11. For the same reason, as is shown in the drawing, the locking element according to FIG. 6 and FIG. 8 can also be fastened by two screw bolts 68 or only one screw bolt 68. The arrangement in the corner of the fold space reduces the risk of a rotation which would impede easy access.

FIG. 3 shows that the swivel lever 25 has virtually the same construction as that known from the prior art (e.g., see FIG. 31 of the prior art). The receptacle, shown at bottom in FIG. 31, for the free end of the swivel lever and the cylinder lock arranged therein is likewise provided at the upper end in the present construction according to the invention as shown in FIG. 3, so that the swivel lever 25 can not only be swiveled into the lower position shown in FIG. 3, but can also be swiveled by 180° into the upward position when needed.

When this possibility is provided, the elongated base plate 5 shown in FIG. 3 is outfitted at the upper and lower ends with a cover cap 70 for example. The latter is secured by two screws 72 which can be screwed into threaded bore holes 271 formed by the base plate 5. In so doing, the door leaf 2 is clamped between the rim regions 73 of the base plate on the one hand and the cup edges 74 of the cover cap 70 on the other hand so that the entire arrangement is secured within the door leaf. The projecting threaded bore hole regions 371 shown in FIG. 3 which serve to receive the screws 72 may also serve to center the base plate 5 within the openings formed by the door leaf, e.g., the rectangular openings A and B or 36, 37 shown in FIG. 7, or other protuberances, upper or lower retaining blocks or projections or edges which can be placed at the circumferential edges of the openings 36, 37 can be used for this purpose.

Figure 14:
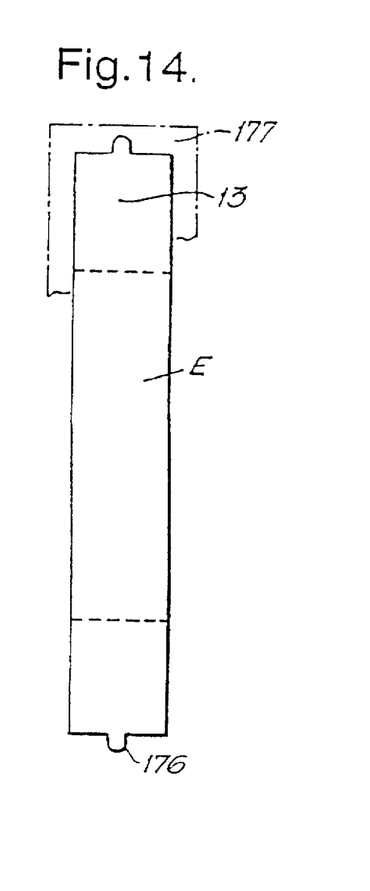
FIG. 14 shows a hole pattern for an arrangement according to FIG. 12.

FIG. 13 shows another type of fastening in which screws 174 can be inserted into threaded bore holes 175 formed by the base plate, these screws 174 being guided through bore holes or notches 176 in hole pattern E according to FIG. 14. In this case, the caps 270 can be guided through the elongated hole E and are thus not supported on the door leaf as in FIG. 3, but rather are tightly connected with the base plate 5, e.g., by gluing or ultrasonic welding. A circumferential sealing leaf 177 supported on the rim region of opening E can seal the remaining parts.

FIG. 3 also shows additional fastening possibilities, e.g., a screw 75 securing a plug or insert 76 which closes and fills the trough-shaped receptacle for the swivel lever 25 in the upper portion of the base plate 5 in the event that only the lower receptacle according to FIG. 3 is required for the swivel lever 25. This plug or insert 76 improves the aesthetic appearance, prevents penetration of dirt and, dust and by using correspondingly different colored material for the surface of this insert or by arranging suitable marks and identifiers, can serve for manufacturer identification or for customizing by the user. This insert is secured, for example, in that it has a threaded pocket bore hole 77 for screwing in the screw 75, whose head can be supported in a suitable manner on the inner surface of the door leaf 2, in which case this screw 75 would simultaneously act as a fastening for the base plate 5, or on a surface 78 formed by the base plate 5 itself, the plate 79 which then in turn secures the head of the screw 75 being supported on this surface 78.

The surface 78 is formed in a simple manner, for instance, in that the opening 80 provided in the base plate 5 for receiving the end of the swivel lever 25 containing the cylinder lock 57 leaves open a rim region on the surface 78 around opening 80 on which the plate 79 can be supported.

Since it is preferably integral with the base plate 5, the shoulder 3 can likewise serve to secure the base plate in the door leaf, e.g., by means of screws 27 which are guided through openings D according to FIG. 7 and are clearly emphasized in FIG. 1 and FIG. 3. These screws contact the inner surface of the door leaf 2 with their head (possibly with the intermediary of a washer) and are guided in a corresponding threaded bore hole of the shoulder 3 so that this shoulder is better secured at the door leaf. The push plate 20 which extends in this region and which will now be described more fully can have corresponding necked-down portions so that its movement is not impeded by these screws.

The closing device 10 is opened and closed by swiveling up the swivel lever 25 and correspondingly displacing the articulated spindle pinion 26 which is arranged in the region of the swivel axis 60 and serves as a nut for the lock. This adjusting movement is transformed into a vertical movement, e.g., by meshing teeth 24 of the pinion 26 with teeth 23 of the push plate 20, and is transmitted through the driver 16 to the locking bar 12 and the locking elements 14, of which there is at least one, arranged on the locking bar 12. As an alternative to the articulated spindle pinion, it is also possible to provide a finger which engages in the push plate to bring about the vertical movement or a fork-shaped part which is connected with the swivel lever and drives the driver 16 directly.

The push plate 20 is held in a positive engagement in an intermediate space formed by the shoulder 3 and the door 2 in a space-saving manner as shown in FIGS. 1, 3 and 4 in a top view, side view and plan view, respectively. The connection between the push plate 20 and the locking bar 12 is effected via a projection 18 which is formed at the driver 16 and is slid into a laterally arranged recess or opening 22. The circumference and number of teeth of the pinion 26 and the number of teeth 23 of the push plate 20 are so designed that a rotation of the pinion 26 by 90° causes a displacement, e.g., by three tooth intervals (distance X according to FIG. 1) and a further rotation by 90°, that is, a total displacement of 180°, causes a displacement by six tooth intervals or two times X. This distance of two times X corresponds exactly to the distance between lines 1, 2 and 3 shown in FIG. 1 and accordingly corresponds to the actuating length resulting for the push plate and for the locking bars articulated at the push plate when the lever is swiveled by 180°. Therefore, when the swivel lever 25 shown in FIG. 1 is swiveled out of the lower position shown in the drawing into the position in which it is swiveled up by 180°, the push plate 20 is displaced from the upper position shown in dashed lines (reference number 20) into a position designated by reference number 120 in FIG. 1. In so doing, the cut out part 28 of the push plate 20 slides past the upper fastening screw 27.

In the case of a closing element according to FIG. 8, this movement causes the roller pin 38 to move out of the open position as shown in FIG. 8 into one of the two possible closing positions, e.g., into the upward closing position, as a result of displacement by distance X. Conversely, closing can also be effected when the roller pin 38 is displaced downward by this distance X.

It may sometimes be advisable to change the closing position by switching the swivel lever position, which was formerly that of the open door, into a swivel lever position for a closed door and vice versa. In this case, it is possible to remove the projection 18 of the driver 16 from one of the three existing recesses 22 and to insert it into a second recess which is at a distance of X from the first recess.

Further, it is possible to convert the driver 16 on the locking bar 12 in such a way that the position of the locking bar 12 does not change, as will be seen from FIG. 3. For this purpose, it is necessary only to loosen the screw 69 and then lift the driver 16 and rotate it by 180° such that the projection 18 moves from the upper position shown in the drawing into the lower position, FIG. 3a, whereupon the driver 16 is again screwed on the locking bar 12 by means of screw 69. The projection now projects into the center recess 22 according to FIG. 1 instead of into the upper recess 22 according to FIG. 1.

The cross-sectional view according to FIG. 4 shows the cooperation of the swivel lever 25 and the articulated spindle pinion 26, at which the swivel lever 25 is articulated through an articulated pin 81, with the push plate 20, the articulated spindle pinion being supported so as to be rotatable and locked axially in an annular space 82 formed in the base plate 5. By means of the corresponding edge 282 of the annular space 82, the base plate 5 accordingly prevents the pinion from being pulled downward by the swivel lever 25. Conversely, the pinion is also pressed against the edge 282 by the swivel lever resulting in a stable rotational support. The row of teeth 23 of the plate 20 then meshes with the teeth 24 of this pinion 26 so that the plate 20 is supported in a sliding manner with slight play between the plane of the door leaf 2 and the inner surface 83 of the shoulder 3.

Figure 12:
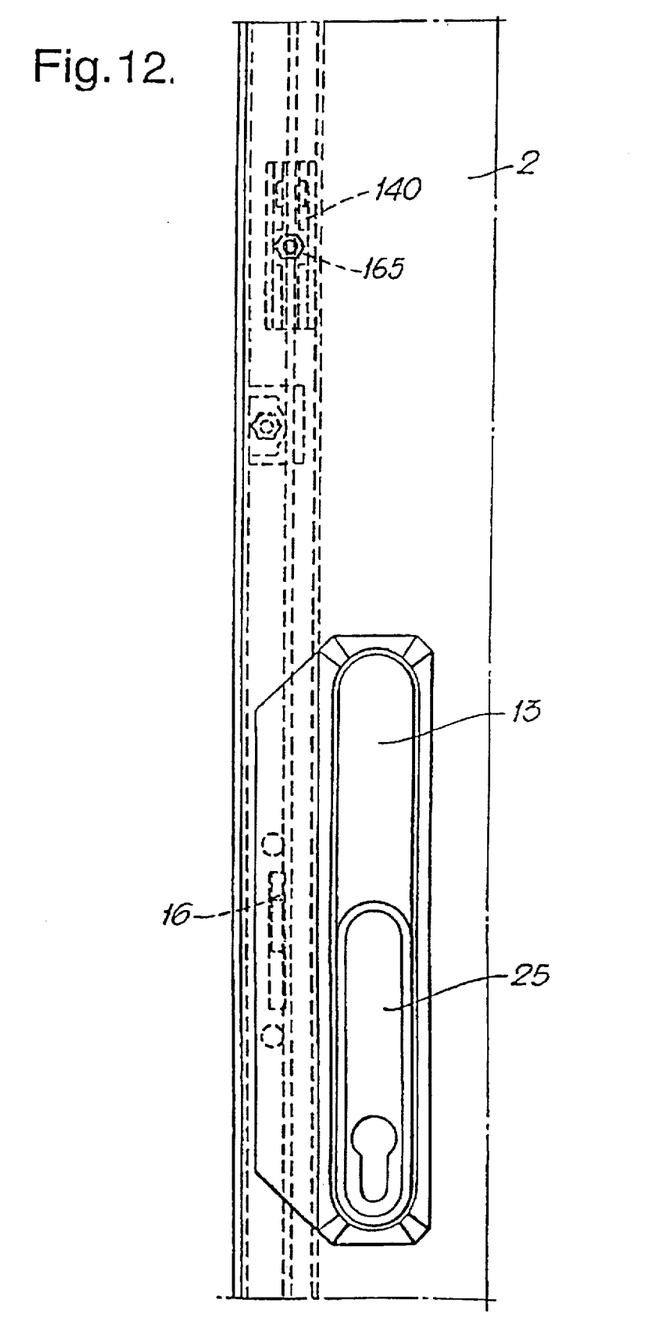
FIG. 12 shows a view similar to FIG. 2.

It will be clear from FIG. 12 in combination with FIGS. 3 to 6 that the driver 16 (with associated slot) lies outside the sealing region of the cabinet. Therefore, the slot in the fold area of the door leaf does not compromise the tightness of the seal. The slot can also serve as a stop for the movement of the driver 16 in that it has only a determined longitudinal extension. Accordingly, the open position, for instance, is unambiguously defined for the user, that is, the user need not search for the run-in region for the rollers 38 which is formed by the locking part 40 or 140. Rather, when reaching the stop, the rollers are situated exactly over opening 165, for example. To change this position, a plurality of axially offset openings 70 can be provided in the bar 12 and/or in the driver 16 similar to the way in which reversal is enabled by the conversion of the driver as was already mentioned.

The device can be applied commercially in a variety of environments, for example, in the construction of switch boxes.

While the foregoing description and drawings represent the preferred embodiments of the present invention, it will be obvious to those skilled in the art that various changes and modifications may be made therein without departing from the true spirit and scope of the present invention.

What is claimed is:

1. A swivel lever closing device for doors of housings or cabinets which have walls of thin material such as sheet steel, for operating locking systems such as locking bars which can be installed in a fold space in sheet-metal cabinet doors, which swivel lever closing device comprises:

a door plate which has a base plate with a swivel lever serving as a handle and with protuberances serving to engage in cut outs in the door;

wherein a first protuberance is formed at one end of the door plate in a region of a locking arrangement for the swivel lever;

wherein a second protuberance is formed at a second end of the door plate and is arranged at the door plate symmetrically with respect to rotation so as to be offset by 180° with reference to an actuating axis of the swivel lever;

wherein a locking bar is provided in a working connection, through a latch, with the swivel lever and an articulated spindle pinion and with receptacles in the cabinet for locking elements formed in the region of the locking bar;

said door plate having a first door plate region and a second door plate region, the first door plate region being formed by the base plate whose protuberances, as upper and lower retaining blocks, can be secured in cut outs in the door;

a second door plate region being formed by a shoulder which is connected with the base plate;

a vertically adjustable push plate being supported at an inside of the shoulder as a latch; and said push plate having a first opening aligned with a center axis of the push plate for receiving a projection projecting from the locking bar and two additional recesses at an interval along a longitudinal axis relative to the first opening, said interval being the distance traveled by the push plate when the swivel lever is rotated by 90°; and, wherein the projection is unitary with and arranged at one end of the driver, the projection having a width and the driver having a longitudinal extension having a length, the length approximately corresponding to the width of the projection plus said interval.

2. A swivel lever closing device according to claim 1, wherein the base plate and lateral shoulder are either formed integral with one another or comprise two parts which can be connected with one another.

3. A swivel lever closing device according to claim 1, wherein a driver is connected with the locking bar in the region of the door plate.

4. A swivel lever closing device according to claim 1, wherein said articulated spindle pinion is connected with said push plate through meshing teeth and the push plate is connected with the locking bar through the driver, and wherein the articulated spindle pinion and the push plate are received in a virtual positive engagement by the base plate and/or the shoulder plate.

5. A swivel lever closing device according to claim 1, wherein the driver is displaceable at an inner side of the door and in the second door plate region and is connected with the locking bar through connection regions, and wherein the driver is guided by the projection into a recess of the push plate which extends at a right angle to the driver, the projection projecting from the locking bar.

6. A swivel lever closing device according to claim 1, wherein the driver has, along a longitudinal axis aligned with an axis of the locking bar, three bore holes through which fastening screws can be inserted, which fastening screws can be received in a threaded bore hole formed by the locking bar, wherein axial spacing of the bore holes corresponds to said interval or to a fraction or a multiple of the interval.

7. A swivel lever closing device according to claim 1, wherein, in addition to the first and second protuberance at the ends of the door plate, at least a third protuberance is arranged in a center region of the door plate.

8. A swivel lever closing device according to claim 1, wherein the push plate is fastened at the shoulder by fasteners, and wherein vertical recesses are formed in the push plate in alignment with the fasteners.

9. A swivel lever closing device according to claim 1, wherein the door plate has threaded bore holes adjacent to retaining blocks in a surface facing the door leaf, fastening screws which extend through the door leaf being insertable in these threaded bore holes.

10. A swivel lever closing device according to claim 1, wherein rollers or projections are provided at two opposing sides of the locking bar adapted for engagement with receptacles in the cabinet, the rollers or projections in combination with the locking bar forming the locking element, and wherein the receptacles are constructed in a complementary manner having vertical run-over surfaces, the locking element engaging the receptacles in the closing position, wherein the receptacles which are preferably fastened in the fold of a cabinet frame or housing frame are constructed as double hooks with a clearance opening directed toward the door for the locking bar, and wherein a vertical wedge surface of the two double hooks opens toward a common line of symmetry at which is provided a receiving slot for the rollers.

* * * * *